United States Patent
Imamura et al.

(10) Patent No.: US 9,170,853 B2
(45) Date of Patent: Oct. 27, 2015

(54) SERVER DEVICE, COMPUTER-READABLE STORAGE MEDIUM, AND METHOD OF ASSURING DATA ORDER

(71) Applicant: FUJITSU LIMITED, Kawasaki-shi, Kanagawa (JP)

(72) Inventors: Nobutaka Imamura, Yokohama (JP); Yoshinori Sakamoto, Kawasaki (JP); Hidekazu Takahashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 32 days.

(21) Appl. No.: 13/644,962

(22) Filed: Oct. 4, 2012

(65) Prior Publication Data

US 2013/0138834 A1 May 30, 2013

(30) Foreign Application Priority Data

Nov. 30, 2011 (JP) ................................. 2011-263049

(51) Int. Cl.
*G06F 9/50* (2006.01)
*G06F 9/48* (2006.01)

(52) U.S. Cl.
CPC ............ *G06F 9/5088* (2013.01); *G06F 9/4856* (2013.01)

(58) Field of Classification Search
USPC ................. 709/218, 231, 205, 207, 238–244; 718/104
See application file for complete search history.

(56) References Cited

U.S. PATENT DOCUMENTS

| 5,778,224 | A | * | 7/1998 | Tobe et al. | 718/100 |
| 7,139,262 | B1 | * | 11/2006 | Elliott | 370/351 |
| 2006/0117101 | A1 | * | 6/2006 | Lauer et al. | 709/224 |
| 2011/0040827 | A1 | | 2/2011 | Katsunuma et al. | |
| 2012/0263263 | A1 | * | 10/2012 | Olsen et al. | 375/354 |

FOREIGN PATENT DOCUMENTS

JP 2011-39820 2/2011

OTHER PUBLICATIONS

Mehul A. Shah et al., "Flux: An Adaptive Partitioning Operator for Continuous Query Systems*", Proceedings of the 19$^{th}$ International Conference on Data Engineering (ICDE'03), 2003, IEEE Computer Society, pp. 25-36.
Extended European Search Report dated May 7, 2015 in corresponding European Patent Application No. 12189927.2.
Zhu, "Dynamic Optimization and Migration of Continuous Queries Over Data Streams", Dissertation submitted at Worchester Polytechnic Institute, Aug. 17, 2006, pp. 211-282 (89 total pages).
CN Office Action dated Aug. 4, 2015 in corresponding CN Patent Application No. 201210424756.X.

* cited by examiner

*Primary Examiner* — Melvin H Pollack
(74) *Attorney, Agent, or Firm* — Staas & Halsey LLP

(57) ABSTRACT

A stop unit stops transmitting data to a plurality of nodes for every predetermined period. An acquisition unit acquires versions of routing tables, which are updated in accordance with movement of a query, from the plurality of nodes when the transmission of the data is stopped. A comparison unit compares the versions of the routing tables of the plurality of nodes that are acquired. When there is a node in which the routing table of an old version is stored as a result of the comparison, an update unit updates the routing table of the node.

9 Claims, 11 Drawing Sheets

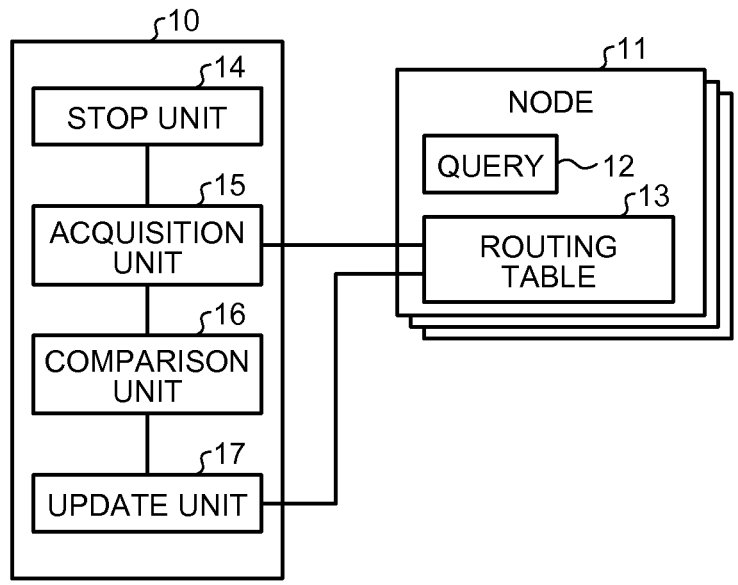
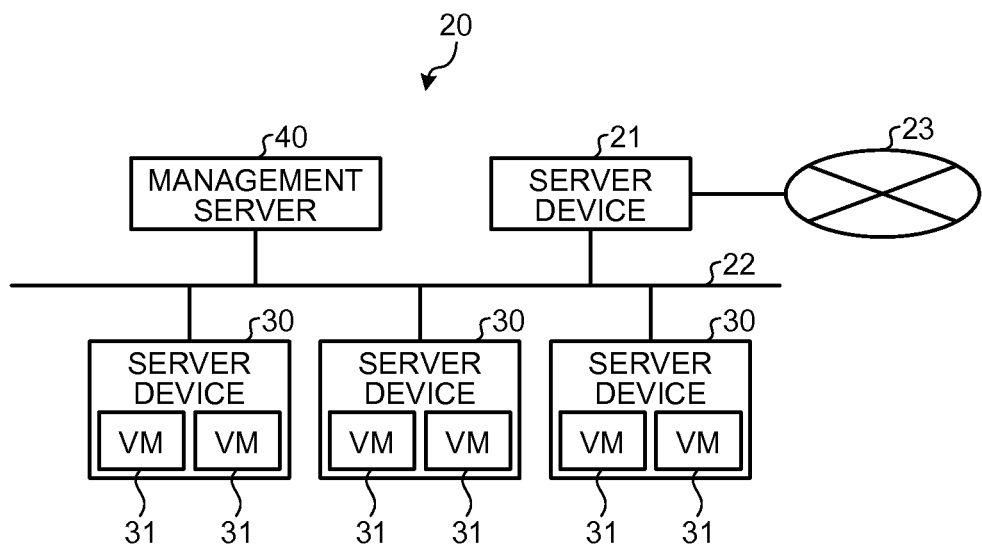

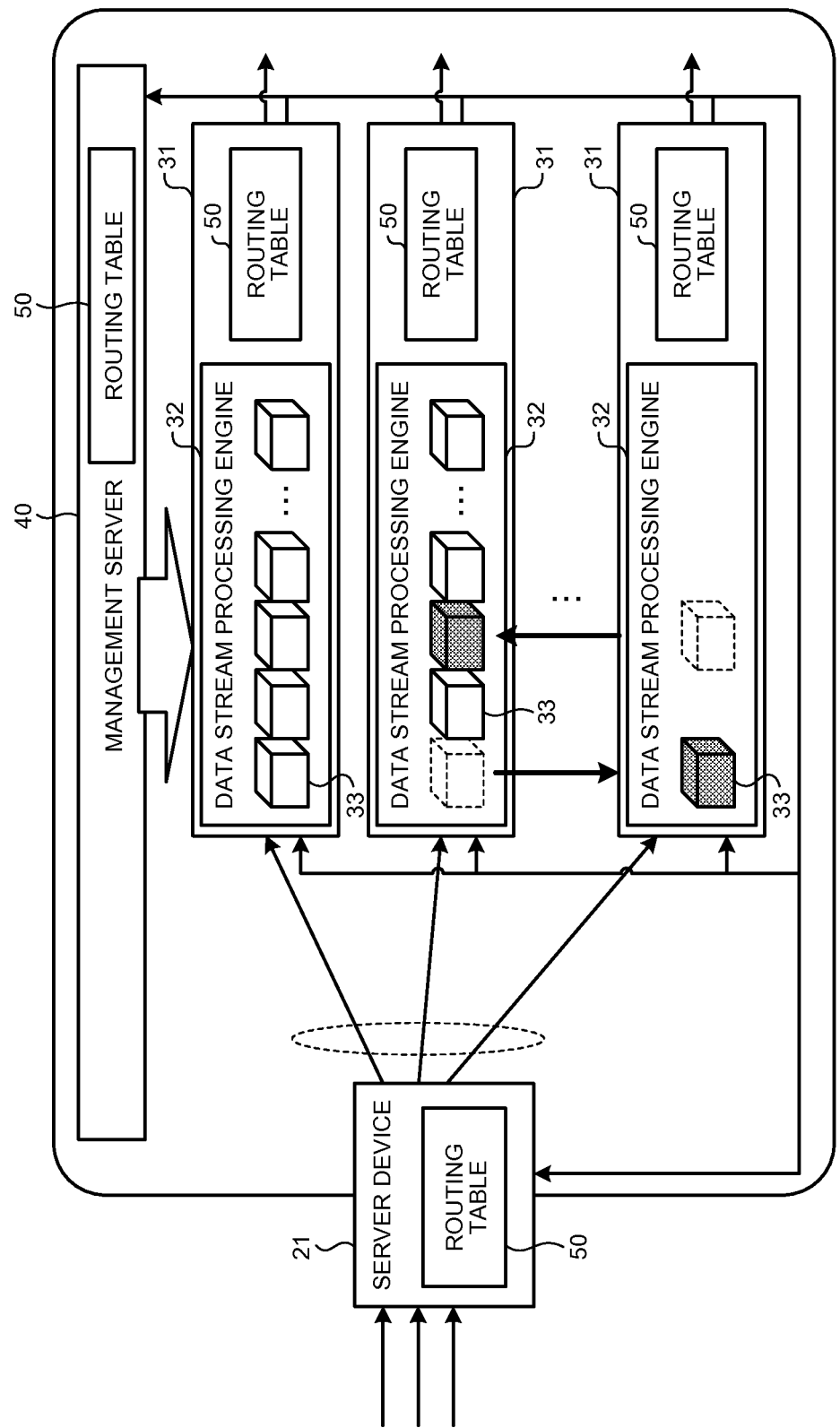

FIG.6

| ID | STORAGE DESTINATION | VERSION NUMBER |
|---|---|---|
| 12 | 1 | 3 |
| ⋮ | ⋮ | ⋮ |

FIG.7

| ID | FILE DESCRIPTOR |
|---|---|
| 0 | 6 |
| 1 | 7 |
| 2 | 10 |
| ⋮ | ⋮ |

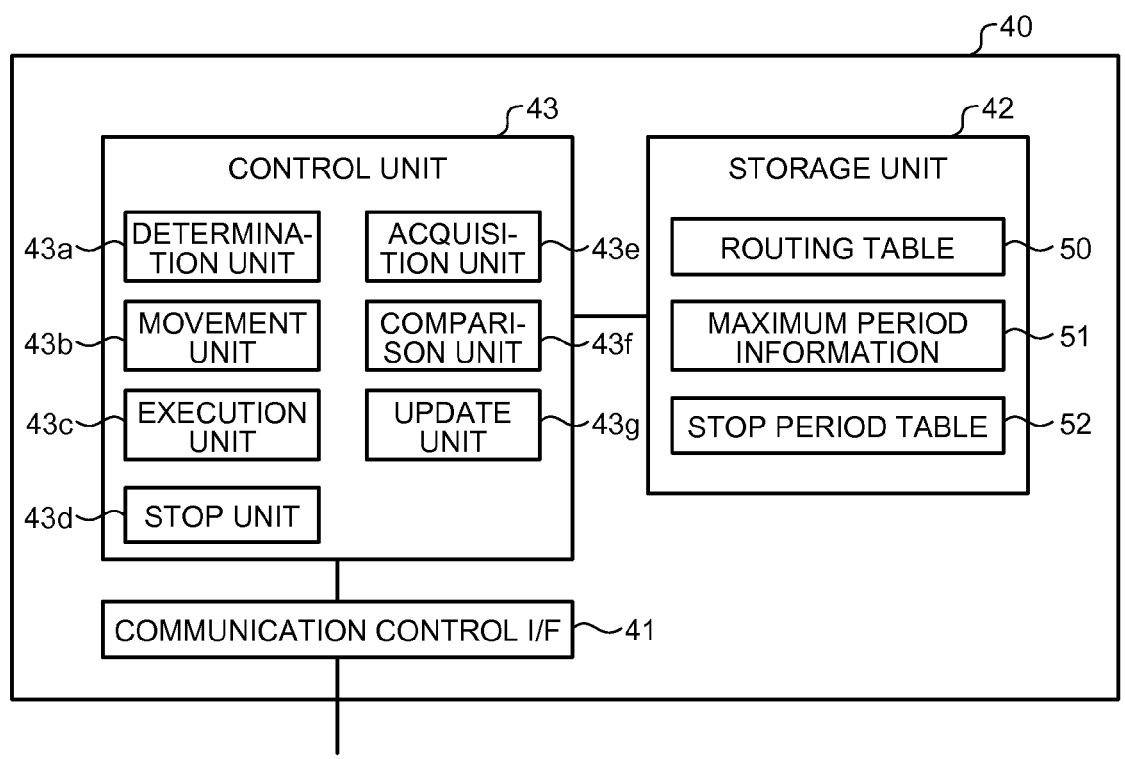

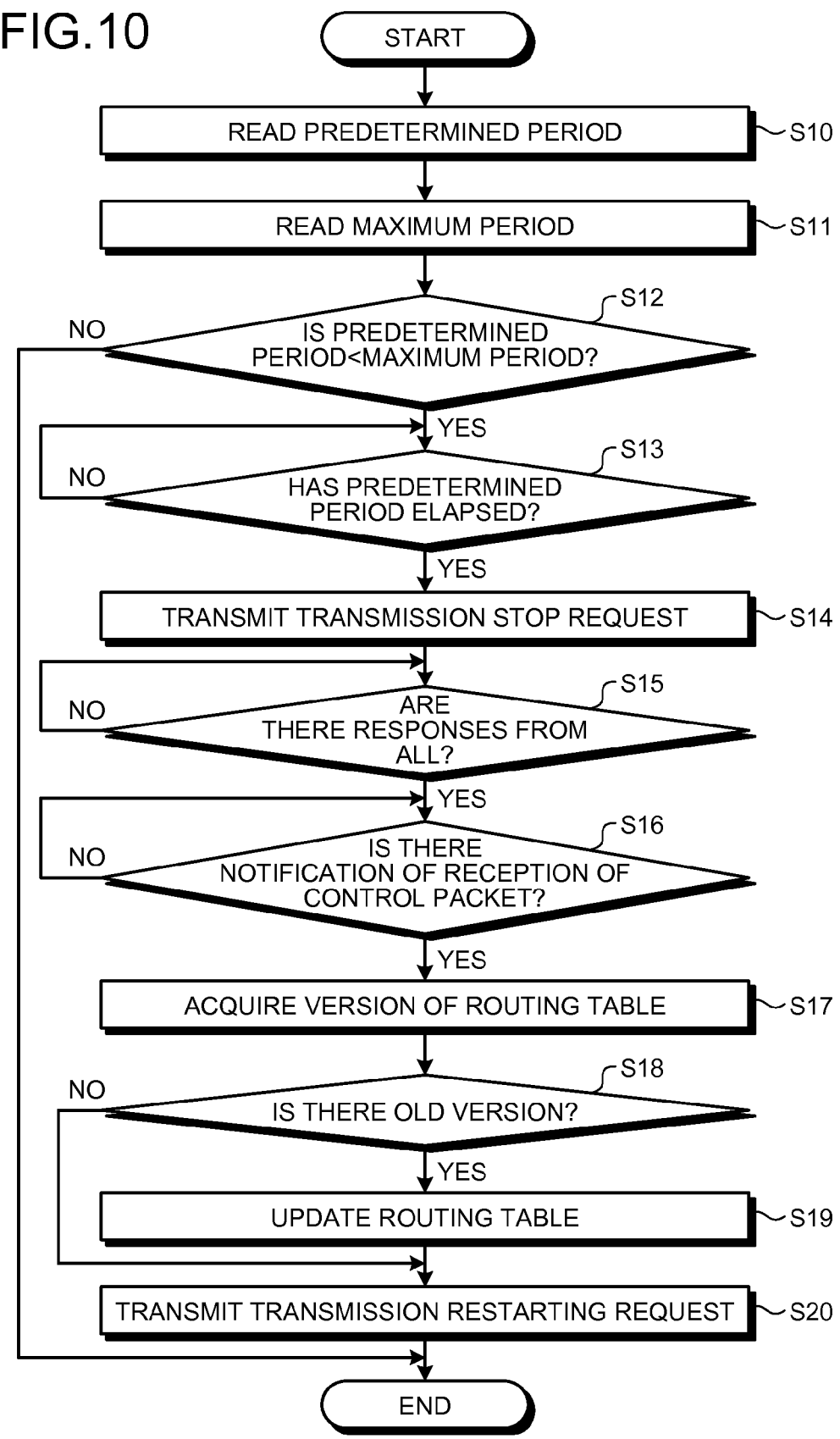

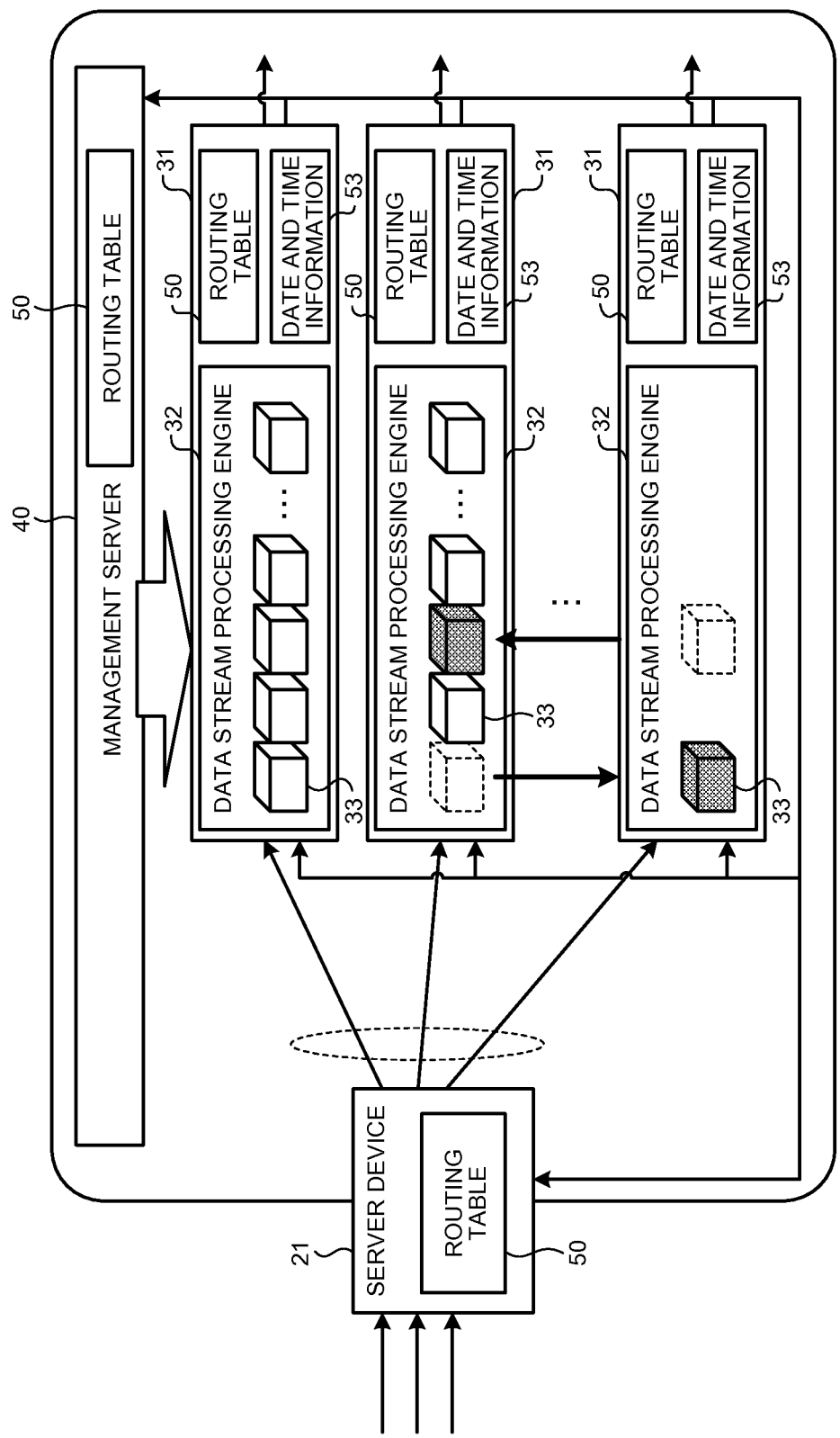

| ID | STORAGE DESTINATION | VERSION NUMBER |
|---|---|---|
| 12 | 1 | 2011/11/1 10:01:20.12 |
| ⋮ | ⋮ | ⋮ |

SERVER DEVICE, COMPUTER-READABLE STORAGE MEDIUM, AND METHOD OF ASSURING DATA ORDER

CROSS-REFERENCE TO RELATED APPLICATIONS

This application is based upon and claims the benefit of priority of the prior Japanese Patent Application No. 2011-263049, filed on Nov. 30, 2011, the entire contents of which are incorporated herein by reference.

FIELD

The embodiments discussed herein are directed to a server device, a data order assuring program, and a method of assuring the data order.

BACKGROUND

Recently, as a technique for processing many sets of data that are collected every moment from various targets in a parallel manner, CEP (complex event processing) has been known. In the complex event processing, an event is detected from received data, and processing relating to the detected event is performed. Although there is when the complex event process is called ESP (event stream processing), here, the complex event processing together with the ESP will be referred to as CEP.

In a CEP system that performs the complex event processing, there is a case where a large amount of received data is temporarily processed, and, in such a case, the processing load increases, and the processing performance may decrease. In addition, since the CEP system is a system that processes data in real time, the CEP system is expected to be always running, and is not allowed to be stopped.

Thus, in the CEP system, by using a system technique, in which resources can be flexibly allocated, used for a cloud or the like, the processing is divided into a plurality of servers or virtual machines (VMs) in accordance with a variation in the processing load. For example, a transaction requesting sentence called a query or data accompanied with a query that is arranged at a server or a virtual machine, which has a high processing load, is moved to another server or another virtual machine as a processing element, whereby the processing is divided.

However, in a CEP system, there is a possibility that the data order changes in a case where the movement of a processing element occurs. For example, it is assumed that a data transmission source server is A, a movement source server of a processing element is B, and a movement destination server of the processing element is C. Here, a case will be considered in which the transmission source server A transmits data to the movement source server B, and a processing element is moved from the movement source server B to the movement destination server C. Data transmitted from the transmission source server A to the movement source server B at timing when the processing element is moved from the movement source server B to the movement destination server C arrives at the movement source server B. Since the processing element has moved to the movement destination server C, the movement source server B transmits the arrived data to the movement destination server C. When the movement of the processing element has been completed, the movement destination server C notifies the transmission source server A of movement completion of the processing element. After the notification of the movement completion, the transmission source server A transmits data directly to the movement destination server C. In such a case, there is a possibility that the data that has been directly transmitted from the transmission source server A to the movement destination server C arrives at the movement destination server C before the data transmitted from the transmission source server A to the movement destination server C through the movement source server B.

When the data order changes as above, there is a case where a represented meaning changes in accordance with the data order. For example, a case will be considered in which a security system, in which a door sensor detecting the unlocking of a front door of a house using a key and a motion sensor detecting a person present indoor are arranged, and data transmitted from the door sensor and the motion sensor is monitored, is realized by a CEP system. In such a case, when the order of data of the detection of opening or closing of the front door using a key, which is acquired by the door sensor, and data of the detection of an indoor motion, which is acquired by the motion sensor, changes, the meaning changes. For example, a case where an object is detected indoor after the detection of unlocking the front door using a key can be regarded as owner's return to the house. On the other hand, a case where the unlocking the front door using a key is detected after detection of an indoor object can be regarded as a thief's flight.

Thus, a technique has been proposed in which the data order is maintained even when the movement of a processing element occurs. In this technique, for example, when a movement source server and a movement destination server of a processing element are determined, a controller that manages a CEP system transmits a movement request to the movement source server and the movement destination server. The movement source server sends pause requests to all the transmission sources that transmit data to the movement source server and waits for ack for the pause requests, thereby locking the transmission of data in the transmission source and buffering data of the processing element as a movement target in the transmission source. When the movement source server receives ack from all the transmission sources, there is no data that is in the process of transmission. The movement source server processes data until ack is received from all the transmission sources. Then, when ack is received from all the transmission sources, the movement source server starts the movement of the processing element. After the movement of the processing element is completed, the movement destination server transmits a restart request to all the transmission sources. When the restart request is received, the transmission source changes the transmission destination of the data to the movement destination server by changing a routing table, restarts the transmission of data, and transmits the buffered data to the movement destination server.

Patent Document 1: Japanese Laid-open Patent Publication No. 2011-039820

Non patent Document 1: Mehul A. Shah, Joseph M. Hellerstein, Sirish Chandrasekaran and Michael J. Franklin, "Flux: An Adaptive Partitioning Operator for Continuous Query Systems", ICDE, 2003

However, according to the related arts, when the processing element is moved, the movement source server stops the transmission of data in the transmission source by transmitting a pause request to all the transmission sources. Therefore, according to the related arts, there is overhead of stopping data processing for every movement of the processing element. More specifically, when many processing elements are moved, data processing is stopped every time when each processing element is moved, and accordingly, the overhead increases.

SUMMARY

According to an aspect of an embodiment, a server device includes a memory; and a processor coupled to the memory, wherein the processor executes a process including, stopping transmitting data to a plurality of nodes, in which a plurality of queries each used for performing a process when the data coincides with a set condition is disposed, each storing a routing table in which, for each data that is a processing target of each query, an arrangement destination of the each query and a version that is updated in accordance with movement of the each query are stored, for every predetermined period, acquiring versions of the routing tables from the plurality of nodes when the transmission of the data is stopped, comparing the versions of the routing tables of the plurality of nodes that are acquired, and updating, when there is a node in which the routing table of an old version is stored as a result of the comparison, the routing table of the node.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram that illustrates the whole configuration of a CEP system that includes a server device according to a first embodiment;

FIG. 2 is a diagram that illustrates an example of the configuration of a CEP system according to a second embodiment;

FIG. 3 is a diagram that schematically illustrates the configuration of the CEP system in accordance with the flow of data;

FIG. 6 is a diagram that illustrates an example of the data configuration of a routing table;

FIG. 7 is a diagram that illustrates an example of the data configuration of a storage destination table;

FIG. 8 is a diagram that illustrates an example of the configuration of a management server;

FIG. 9 is a diagram that illustrates an example of the data configuration of a stop period table;

FIG. 10 is a flowchart that illustrates the sequence of a data order assuring process;

FIG. 11 is a diagram that schematically illustrates the configuration of a CEP system according to a third embodiment;

DESCRIPTION OF EMBODIMENTS

Figure 4A:
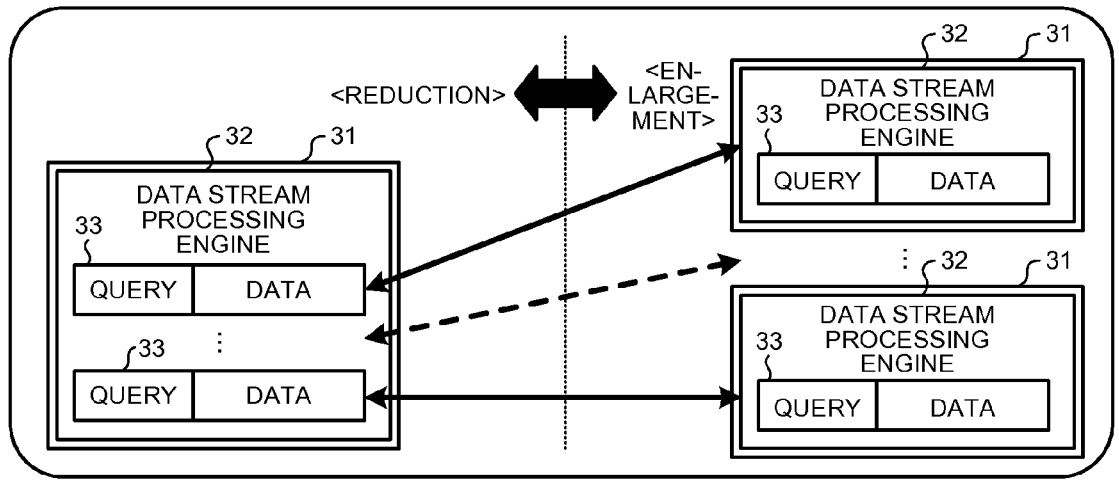
FIG. 4A is a diagram that illustrates an example of the movement of a query.

Preferred embodiments of the present invention will be explained with reference to accompanying drawings. However, the present invention is not limited to the embodiments. In addition, the embodiments can be appropriately combined in a range not causing the processing contents to be contradictory to each other.

[a] First Embodiment

A server device according to a first embodiment will be described. FIG. 1 is a diagram that illustrates the whole configuration of a CEP system that includes the server device according to the first embodiment. A server device 10 is a physical server that manages the CEP system and, for example, is a server computer for management which is disposed in a data center or each company. The server device 10 can communicate with a plurality of nodes 11. Each node 11 is a server device or a virtual machine that is operated in a server device. In each node 11, a plurality of queries 12 are arranged in a distributed manner, which are used for performing processes when the data coincides with set conditions. Data collected from various targets is delivered to each node 11. When the received data coincides with the condition that is set in the query 12, the node 11 performs a process that is set by the query 12.

The query 12 arranged in each node 11 can be moved between the nodes 11. For example, when the query 12 is moved for the distribution of the processing load or the like, each node 11 moves the query 12 without stopping the transmission of data from a data transmission source. Each node 11 stores a routing table 13 in which the arrangement destination of a query 12 and a version updated in accordance with the movement of the query 12 for each data entry that is a processing target of each query 12 are stored. When the query 12 is moved, each node 11 updates the arrangement destination and the version of the moved query 12 that are stored in the routing table 13. For example, When the query 12 is moved, the node 11 of the movement destination updates the arrangement destination and the version of the moved query 12 that are stored in the routing table 13 and notifies the other nodes 11 of the moved query 12 and the movement destination. When each node 11 is notified of the movement of the query 12 and the movement destination, the node 11 updates the arrangement destination and the version of the moved query 12 that are stored in the routing table 13.

As illustrated in FIG. 1, the server device 10 includes a stop unit 14, an acquisition unit 15, a comparison unit 16, and an update unit 17.

The stop unit 14 temporarily stops the delivery of data. For example, the stop unit 14 stops transmitting data to each node 11 for every predetermined period. The stop unit 14 stops the transmission of data by transmitting a data transmission stop request to a transmission source that periodically transmits the data at a predetermined period. In addition, when the versions of the routing tables 13 are the same as a result of the comparison performed by the comparison unit 16 to be described later or when the update of the routing table 13 is completed by the update unit 17 to be described later, the stop unit 14 restarts the transmission of data by transmitting a data transmission restarting request to the transmission source.

The acquisition unit 15 acquires various kinds of information. For example, when the transmission of data is stopped by the stop unit 14, the acquisition unit 15 acquires the version of the routing table 13 from each node 11. The acquisition unit 15, for example, transmits a request for transmitting the version of the routing table 13 to each node 11. Then, the acquisition unit 15 acquires the version of the routing table 13 from each node 11 by receiving a notification of the version from each node 11.

The comparison unit 16 performs various comparison operations. For example, the comparison unit 16 compares the versions of the routing tables 13 of the nodes 11 that are acquired by the acquisition unit 15.

The update unit 17 performs various update operations. For example, as a result of the comparison performed by the comparison unit 16, when there is the node 11 in which a routing table 13 of an old version is stored, the update unit 17 updates the routing table 13 of the node 11. When a routing table 13 of an old version is stored in one of the nodes 11, the update unit 17 requests the node 11 in which a routing table 13 of a new version is stored to transmit information of the routing table 13. When the routing table 13 is received from the node 11, the comparison unit 16 transmits the content of the routing table 13 to the node 11 in which the routing table 13 of the old version is stored and updates the routing table 13 of the node 11. In addition, when the server device 10 stores a routing table 13, and the routing table 13 is new, the content of the stored routing table 13 may be transmitted.

In addition, in the example illustrated in FIG. 1, in order to represent the functional configuration, the stop unit 14, the acquisition unit 15, the comparison unit 16, and the update unit 17 are divided separately from one another, for example, the functional configuration may be configured by one device. As examples of the device includes an electronic circuit such as a CPU (central processing unit), an MPU (micro processing unit), or the like. In addition, as the device, an integrated circuit such as an ASIC (application specific integrated circuit) or an FPGA (field programmable gate array) may be used.

Here, in a CEP system, there is a case where the assurance of precise data processing order is not requested, but the assurance of data processing order with accuracy that is requested by a process configured as a system is sufficient, depending on the characteristics of the process configured as the system. For example, a case will be described where a security system, in which a door sensor that detects the unlocking of a front door of a house using a key and a motion sensor that detects a person present indoors are arranged, and data transmitted from the door sensor and the motion sensor is monitored, is realized by a CEP system. In such a security system, there is an interval of about several seconds when a person enters the inside of the house after unlocking the front door using a key.

Thus, the server device 10 stops transmitting data to each node 11 for every predetermined period for which the data order of requested accuracy is assured, compares the versions of the routing tables 13 of the nodes 11, and updates the routing table 13 of an old version. For example, when the above-described security system is realized by the CEP system, the predetermined period is determined to be in the range of several hundreds of milliseconds to several seconds. The predetermined period may be stored in a storage unit that is disposed in the server device 10. In addition, it may be configured such that the predetermined period is stored in an external storage device and is read from the external storage device. Furthermore, the predetermined period may be defined in a program that stops transmitting data to each node 11 for every predetermined period. As above, the server device 10 acquires the consistency of the routing table 13 of each node 11 by stopping the process of data for each period for which the data order of accuracy requested by a process configured as a system is assured. Thus, according to the server device 10, compared to a case where data processing is stopped every time the query 12 is moved, the occurrence of overhead can be suppressed. More specifically, when a plurality of queries 12 are moved between the nodes 11, although the overhead increases when the data processing is stopped for each movement of the query 12, by acquiring the consistency of the routing table 13 by stopping data processing for every predetermined period, the overhead can be suppressed.

As above, the server device 10 stops transmitting data to the plurality of nodes 11 for every predetermined period. In addition, when the transmission of data is stopped, the server device 10 acquires the versions of the routing tables 13 from a plurality of nodes 11. Then, the server device 10 compares the acquired versions of the routing tables 13 of the plurality of nodes 11 with one another. When there is a node 11 in which a routing table 13 of an old version is stored as a result of the comparison, the server device 10 updates the routing table 13 of the node 11. From this, according to the server device 10, the data processing order of accuracy that is requested by the process configured as a system can be assured. In addition, according to the server device 10, the overhead that is accompanied with the movement of the query 12 can be suppressed.

[b] Second Embodiment

A second embodiment will now be described. In the second embodiment, a CEP system 20 will be described in which VMs (virtual machines) 31 are operated on a plurality of server devices 30, and a plurality of queries 33 as indicated in FIG. 3 are distributed so as to be arranged in the VMs 31. FIG. 2 is a diagram that illustrates an example of the configuration of the CEP system according to the second embodiment. The CEP system 20 includes a server device 21, a plurality of server devices 30, and a management server 40. The server device 21, each server device 30, and the management server 40 are interconnected to be communicable through a network 22. As one type of such a network 22, there is an arbitrary communication network such as a LAN (local area network) or a VPN (virtual private network), regardless whether the network is wired or wireless.

In the server device 30, the VMs 31 are operated. In each VM 31, a plurality of queries 33 are distributed so as to be arranged. The server device 21 receives data from various targets through an external network 23 and delivers the received data to the VM 31 in which a query 33 having the data as a processing target is arranged. The management server 40 manages the server device 21 and each server device 30 and controls the movement of a query 33 that is arranged in each VM 31. In addition, in the example illustrated in FIG. 2, although three server devices 30 are illustrated, the number of the server devices 30 may have any value.

FIG. 3 is a diagram that schematically illustrates the configuration of the CEP system in accordance with the flow of data. The server device 21, the VMs 31, and the management server 40 store routing tables 50 in which the arrangement destination of the query 33 and the version that is updated in accordance with the movement of the query 33 for each data entry as a processing target of each query 33 are stored.

The server device 21 receives multiple data entries from various targets through the external network 23 indicated in FIG. 2. The server device 21 performs preprocessing in which the received data entries are arranged in a predetermined data configuration. Then, the server device 21 specifies the arrangement destination of the query 33 having the received data as a processing target based on the routing table 50 and transmits the data after the preprocessing to the VM 31 of the specified arrangement destination. In this embodiment, although one server device 21 is illustrated, it may be configured such that a plurality of server devices 21 are arranged, and the data received by the plurality of server devices 21 is distributed.

The VM 31 operates a data stream processing engine 32. The data stream processing engine 32 is software that realizes a complex event process. The data stream processing engine 32 detects an event by matching the received data with the conditional equation of the query 33 and controls the execution of the detected event. In addition, in the CEP system 20, a series of processes may be executed in accordance with a plurality of queries 33. For example, it may be configured such that data as an execution result acquired in accordance with an upper-level query 33 is transmitted to a lower-level query 33 so as to be input data of a lower-level query 33. When a series of processes is performed in accordance with a plurality of queries 33, the data stream processing engine 32 transmits the data as an execution result of the queries 33 to the VM 31 in which a lower-level query 33 is operated. In addition, the data stream processing engine 32 controls the process of moving the query 33 to or from the data stream processing engine 32 operating on another VM 31 in accordance with an instruction for moving the query 33 that is transmitted from the management server 40. When data that is the processing target of the moved query 33 is received, the data stream processing engine 32 transmits the received data to the VM 31 that is the movement destination of the query 33. In addition, when a transmission stop request to be described later is received from the management server 40, the data stream processing engine 32 performs a checking process in which it is checked whether there is data that is in the middle of the transmission process between VMs 31. For example, the data stream processing engine 32 transmits control packets to the data stream processing engines 32 of all the other VMs 31. Then, the data stream processing engine 32 waits for the reception of a control packet that is transmitted from the other VMs 31.

Here, in a case where data that is in the middle of the transmission process between VMs 31 is present at the timing when the transmission stop request is received, the VM 31, before receiving control packets from all the other VMs 31 after the transmission of the control packet to the other VMs 31, receives the transmission data to be transmitted to the other VMs 31. On the other hand, in a case where the data that is in the middle of the transmission process between the VMs 31 is not present, the VM 31 receives control packets from all the other VMs 31 without receiving transmission data after the transmission of control packets to the other VMs 31.

When transmission data is received before receiving control packets from all the other VMs 31, the data stream processing engine 32 transmits the transmission data to the VM 31 of the transmission destination. Then, the data stream processing engine 32 transmits requests for re-performing a checking process. In a case where the request for re-performing the checking process is received, the data stream processing engine 32 of each VM 31 transmits control packets to the data stream processing engine 32 of all the other VMs 31 again.

On the other hand, in a case where control packets are received from all the other nodes 11 without the reception of transmission data, the data stream processing engine 32 notifies the server device 10 of the reception of the control packets from all the VMs 31. In addition, the data stream processing engine 32 of each VM 31 may notify the server device 10 of the notification. Furthermore, when the data stream processing engine 32 of one VM 31 representatively receives notifications from all the other VMs 31 without receiving the request for re-performing the checking process, the data stream processing engine 32 may notify the server device 10 thereof.

Here, the movement of the query 33 will be described. There are cases where a query 33 includes accompanying data. For example, when a process of calculating an average of data as a processing target over a predetermined period is performed, the query 33 maintains data that has been received over the predetermined period so as to calculate the average. In addition, there are cases where the query 33 uses predetermined data such as a table or the like for the process. When a query 33 is moved, the data stream processing engine 32 moves the query 33 and data accompanied by the query 33 as processing elements.

In addition, in the movement of a query 33, the following cases may be considered. FIG. 4A is a diagram that illustrates an example of the movement of a query 33. As illustrated in FIG. 4A, when data as a processing target is different for each query 33, the query 33 is moved, and data as the processing target is processed at the movement destination. For example, when the processing is distributed, the queries 33 are respectively moved to the VMs 31 that are different from one another, and data is processed by the VMs 31. On the other hand, for example, when the processing load is low, the queries 33 are moved to one VM 31, and data is processed by one VM 31.

Figure 4B:
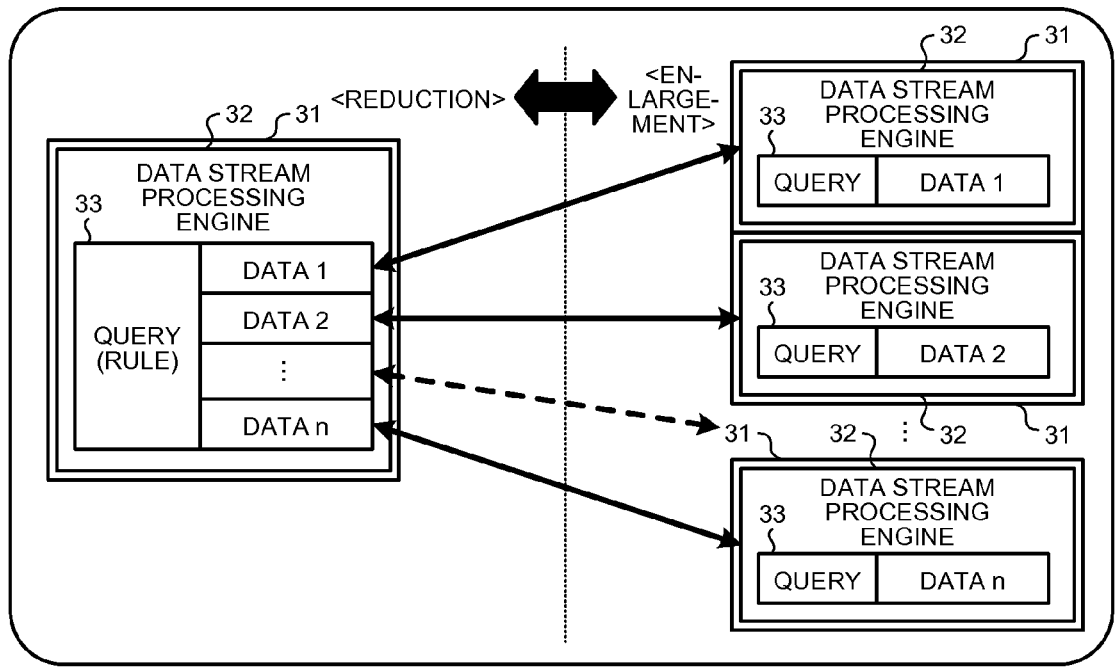
FIG. 4B is a diagram that illustrates another example of the movement of a query.

On the other hand, there are cases where there are a plurality of data entries that are processing targets of a query 33. For example, there is a case where a ticker symbol and a stock price are delivered to the VM 31 as data, and a process of calculating a moving average of the stock prices of each ticker symbol over a predetermined period is performed by one query 33. FIG. 4B is a diagram that illustrates another example of the movement of a query 33. As illustrated on the left side in FIG. 4B, the query 33 has data 1 to data n as processing targets. In such a case, for each one of data 1 to data n as the processing targets, the query 33 is moved. For example, when the processing is distributed, the queries 33 are replicate and are moved to different VMs 31, and data 1 to data n as the processing target are processed by the VMs 31 that are different from each other. On the other hand, for example, when the processing load is low, the queries 33 are arranged in one VM 31, and data 1 to data n as processing targets are processed by one VM 31.

Figure 5:
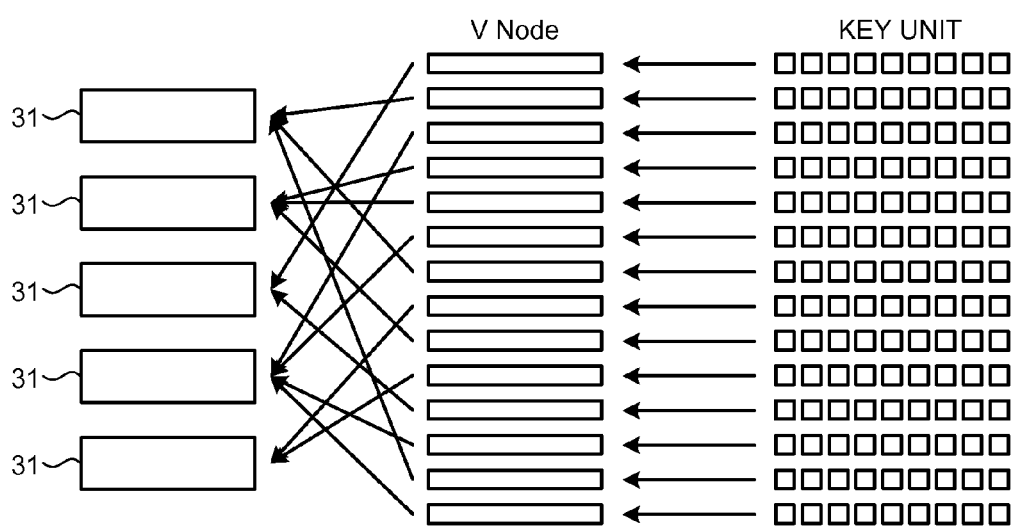
FIG. 5 is a diagram that illustrates an example of grouping queries.

However, in a case where each query 33 is individually directed to be moved and is moved, the number of directions for movement increases as the number of queries 33 as movement targets increases. In addition, in a case where the query 33 stores the arrangement destination in the routing table 50 for each data entry that is a processing target, the amount of data in the routing table 50 increases as data that is a processing target of the query 33 increases. Thus, in this embodiment, a plurality of queries 33 are divided into a plurality of groups, and the queries of each group are moved. In addition, the routing table 50 manages the storage destination of each group. FIG. 5 is a diagram that illustrates an example of grouping the queries 33 indicated in FIG. 3. For example, it is assumed that a key used for identifying each data entry is included as integer data of 32 bits in each data entry as a processing target, and keys different from one another are set to the processing conditions of the queries 33. In such a case, for example, grouping is performed such that queries 33 having the same remainder acquired by dividing the key set in the processing condition by a predetermined integer value are divided into the same group. As an example, grouping is statically performed such that queries 33 having the same remainder that is acquired by dividing the key set in the processing condition by 8191 are divided into the same group. Accordingly, the queries 33 are divided into 8191 groups. In the example illustrated in FIG. 5, each group acquired by dividing the queries 33 into groups is denoted by V-Node. In this embodiment, the queries 33 are arranged in the VMs 31 for each V-Node.

In the routing table 50, an arrangement destination and a version are stored for each V-Node. FIG. 6 is a diagram that illustrates an example of the data configuration of the routing table. As illustrated in FIG. 6, the routing table 50 has items of an ID, a storage destination, and a version number. The item of the ID is an area in which an ID used for identifying V-Node is stored. The item of the storage destination is an area in which an ID representing the VM 31 of the storage destination is stored. The item of the version number is an area in which a value representing the version is stored. In the example of FIG. 6, it is represented that an ID of the VM 31 of the storage destination is "1", and a version is "3" at V-Node having an ID of "12".

The server device 21 and the data stream processing engine 32 of each VM 31 determine the storage destination of a query 33 based on the key. For example, when a key included in the received data is 8203, the server device 21 calculates a remainder acquired by dividing 8203 by 8191, that is, 12. Then, the server device 21 acquires a storage destination for an ID of the V-Node of 12 from the routing table 50. In the example illustrated in FIG. 6, the ID of the VM 31 of the storage destination of which the ID of the V-Node is 12 is acquired as 1.

In each VM 31, an IP address and a port number for communication are determined, and a file descriptor is assigned thereto in accordance with the IP address and the port number of each VM 31. The server device 21, each VM 31, and the management server 40 store a file descriptor number and an ID that represents the VM 31 in a storage destination table. FIG. 7 is a diagram that illustrates an example of the data configuration of the storage destination table. As illustrated in FIG. 7, in the storage destination table, items of the ID and the file descriptor are included. The item of the ID is an area in which the ID of the VM 31 is stored. The item of the file descriptor is an area in which a file description number that is allocated to a communication line connected to the VM 31 represented by the ID is stored. The example of FIG. 7 represents that a file descriptor number that is allocated to the communication line connected to the VM 31 having an ID of "0" is "6".

When communication is performed with the VM 31, a file descriptor number corresponding to the ID of the VM 31 that is the communication target is acquired from the storage destination table. For example, when the ID of the VM 31 that is the communication target is "1", the file descriptor number for the VM 31 having an ID of 1 is acquired from the storage destination table as "7". Then, communication is performed with the VM 31 of the communication target through a TCP/IP socket using the acquired file descriptor number.

In addition, each VM 31 detects the load states of resources that are assigned from each server device 30 such as usage rates of a CPU and a memory and transmits load information that represents detected load states to the management server 40. The management server 40 specifies a query 33 that is a movement target based on the load information that is transmitted from each VM 31. Then, the management server 40 transmits a direction for moving the query 33 that is the movement target. In addition, in this embodiment, the queries 33 are moved in units of V-Nodes. The management server 40 transmits a movement direction that includes the ID of the VM 31 of the movement destination and the ID of the V-Node that is the movement target to the VM 31 of a movement source. The data stream processing engine 32 of the VM 31 that has received the movement direction serializes processing elements such as queries 33 belonging to the V-node, which is the movement target, and data accompanied by the queries 33 and transmits the serialized processing elements to the VM 31 of the movement destination.

The data stream processing engine 32 of the VM 31 of the movement destination restores the transmitted data through deserialization and starts operating the restored queries 33. In addition, the data stream processing engine 32 updates the storage destination of the queries 33 belonging to the V-Node that is the movement target, which are stored in the routing table 50, with the ID of the VM 31 in which the data stream processing engine 32 is operated and updates the version. For example, the data stream processing engine 32 updates the value of the version with a value acquired by adding one thereto. Then, the data stream processing engine 32 notifies each VM 31, the server device 21, and the management server 40 of the ID of the V-Node as the movement target and the ID of the VM 31 as the movement destination.

When the movement is notified, each VM 31, the server device 21, and the management server 40 update the storage destination of the queries 33 belonging to the notified V-Node as the movement targets in the routing table 50 with the ID of the notified VM 31 as the movement destination and updates the version. For example, each VM 31, the server device 21, and the management server 40 receive a value acquired by adding one to the value of the version and update the value of the version therewith.

FIG. 8 is a diagram that illustrates an example of the configuration of the management server. As illustrated in FIG. 8, the management server 40 includes a communication control I/F unit 41, a storage unit 42, and a control unit 43.

The communication control I/F unit 41 includes at least one port and is an interface that controls communication between each VM 31 and the server device 21. The communication control I/F unit 41 transmits and receives various kinds of information to and from each VM 31 and the server device 21. For example, the communication control I/F unit 41 receives the load information from each VM 31. In addition, the communication control I/F unit 41 transmits various directions to the VMs 31.

The storage unit 42 stores various kinds of information. For example, the storage unit 42 stores the above-described routing table 50, maximum period information 51, and a stop period table 52 therein. Examples of a device configuring the storage unit 42 include a semiconductor memory that can rewrite data such as a flash memory or a non-volatile static random access memory (NVSRAM) and a storage device such as a hard disk or an optical disc.

The maximum period information 51 is a stored maximum period that is needed for transmission when data is transmitted among a plurality of VMs 31 in the CEP system 20. The maximum period information 51 is registered by a determination unit 43a of the CEP system 20 from a terminal device such as a client computer that is regarded to be communicable with the management server 40 or an input device such as a mouse, a keyboard, or the like that is disposed in the management server 40.

The stop period table 52 is a table in which predetermined periods, in which the transmission of data is stopped, are stored for groups acquired by dividing the plurality of queries 33 into a plurality of groups. FIG. 9 is a diagram that illustrates an example of the data configuration of the stop period table. As illustrated in FIG. 9, in the stop period table 52, items of an ID and a period are included. The item of the ID is an area in which the ID of the V-Node is stored. The item of the period is an area in which a period, in which the processing order is assured, is stored in units of milliseconds. In the example illustrated in FIG. 9, the predetermined period of the V-Node having an ID of "12" is about "100" ms.

The control unit 43, for example, is an electronic circuit such as a CPU that includes an internal memory and the like and includes a determination unit 43a, a movement unit 43b, an execution unit 43c, a stop unit 43d, an acquisition unit 43e, a comparison unit 43f, and an update unit 43g.

The determination unit 43a performs various determinations. For example, the determination unit 43a determines whether or not there is a load state of each VM 31, which is represented in the load information transmitted from each VM 31, which is allowed load or more.

The movement unit 43b moves the query 33. For example, when there is a VM 31 that has been determined to have an allowed load or more by the determination unit 43a, the movement unit 43b moves any one of V-Nodes that are arranged in the VM 31. The movement unit 43b, for example, specifies a VM 31 having a low load state based on the load information that is transmitted from each VM 31. Then, the movement unit 43b transmits a movement direction with the VM 31 determined to have the allowed load or more being set as a movement source, the VM 31 having a low load state being set as a movement destination, and any one of the V-Nodes arranged in the VM 31 determined to have the allowed load or more being set as a movement target.

The execution unit 43c reads a predetermined period that corresponds to the moved V-Node from the stop period table 52. In addition, the execution unit 43c reads the maximum period information 51. Then, when the predetermined period that corresponds to the moved V-Node is shorter than the maximum period represented by the maximum period information 51, the execution unit 43c executes the processes of the stop unit 43d, the acquisition unit 43e, the comparison unit 43f, and the update unit 43g to be described later. On the other hand, when the requested period is the maximum period or more, the execution unit 43c stops the process of the stop unit 43d, the acquisition unit 43e, the comparison unit 43f, and the update unit 43g.

Here, when the period that corresponds to the moved V-Node is longer than the maximum period, until the period corresponding to the V-Node elapses after the movement of the query 33, data relayed from the VM 31 as the movement source through each VM 31 arrives at the VM 31 as the movement destination. Therefore, the data order before or after the period that corresponds to the V-Node is assured. Accordingly, when the period corresponding to the moved V-Node is the maximum period or more, the execution unit 43c stops the processes of the stop unit 43d, the acquisition unit 43e, the comparison unit 43f, and the update unit 43g. In this way, according to the management server 40, the execution of an unnecessary process can be suppressed.

The stop unit 43d stops the transmission of data when a predetermined period corresponding to the V-Node elapses after the movement of the V-Node. For example, When the predetermined period corresponding to V-Node elapses after the ID of the V-Node as the movement target and the ID of the VM 31 as the movement destination are notified from the movement destination of the V-Node, the stop unit 43d transmits a transmission stop request to the transmission source of data and each VM 31. When the transmission stop request is received, the data stream processing engine 32 of each VM 31 performs a checking process for checking whether there is data that is in the middle of a transmission process between the VMs 31 and notifies the server device 10 of the reception of the control packets from all the VMs 31 when there is no data that is in the middle of the transmission process.

As a result of the comparison performed by the comparison unit 43f to be described later, when the versions of the routing tables 50 are the same, or the update of the routing table 50 performed by the update unit 43g to be described later is completed, the stop unit 43d restarts the transmission of data by transmitting a data transmission restarting request to the transmission source.

When the reception of the control packets is notified from all the VMs 31, the acquisition unit 43e acquires the versions that correspond to the moved V-Node, which are stored in the routing table 50, from each VM 31 and the server device 21. For example, the acquisition unit 43e transmits a request for transmitting the version corresponding to the moved V-Node to each VM 31 and the server device 21. Then, by receiving the notification of the versions from each VM 31 and the server device 21, the acquisition unit 43e acquires the versions from each VM 31 and the server device 21.

The comparison unit 43f compares the acquired versions of the routing tables 50 of each VM 31 and the server device 21 with each other.

When a routing table 50 of an old version is stored in any one of the VMs 31 and the server device 21 as a result of the comparison, the update unit 43g updates the routing table 50. For example, in a case where the version of the routing table 50 that is stored in the storage unit 42 is new, the update unit 43g transmits the information of the routing table 50 stored in the storage unit 42 to the VM 31 or the server device 21 in which the routing table 50 of the old version is stored. In addition, when the version of the routing table 50 stored in the storage unit 42 is old, the update unit 43g requests the VM 31 or the server device 21 in which the routing table 50 of a new version is stored to transmit the information of the routing table 50. Then, when the information of the new routing table 50 is received, the update unit 43g transmits the received information to the VM 31 or the server device 21 in which the routing table 50 of the old version is stored. In addition, the update unit 43g updates the routing table 50 that is stored in the storage unit 42 with the received information.

Next, the flow of the process will be described, in which the management server 40 according to this embodiment assures the data order. FIG. 10 is a flowchart that illustrates the sequence of a data order assuring process. This data order assuring process, for example, is performed at the timing when the ID of the V-Node as the movement target and the ID of the VM 31 as the movement destination are notified from the movement destination of the V-Node.

As illustrated in FIG. 10, the execution unit 43c reads a predetermined period that corresponds to the moved V-Node from the stop period table 52 in Step S10. In addition, the execution unit 43c reads the maximum period that is stored as the maximum period information 51 in Step S11. Then, the execution unit 43c determines whether or not the predetermined period corresponding to the moved V-Node is shorter than the maximum period in Step S12. When the predetermined period is the maximum period or more (No in Step S12), the execution unit 43c ends the process. On the other hand, when the predetermined period is shorter than the maximum period (Yes in Step S12), the stop unit 43d determines whether or not the predetermined period corresponding to the V-Node has elapsed after the notification of the movement of the V-Node in Step S13. When the predetermined period has not elapsed (No in Step S13), the process proceeds to Step S13 again, and the elapse of the predetermined period is waited. On the other hand, when the predetermined period has elapsed (Yes in Step S13), the stop unit 43d transmits a transmission stop request to the transmission source of data and each VM 31 in Step S14. The stop unit 43d determines whether or not ACK for the transmission stop request has been acquired from all the transmission sources in Step S15. When ACK has not been acquired (No in Step S15), the process proceeds to Step S15 again, and ACK is waited. On the other hand, when ACK has been acquired (Yes in Step S15), the acquisition unit 43e determines whether or not notifications of the reception of control packets from all the VMs 31 have been received in Step S16. When the notifications have not been acquired from all the VMs 31 (No in Step S16), the process proceeds to Step S16 again, and the notifications are waited.

On the other hand, when the notifications have been acquired from all the VMs 31 (Yes in Step S16), the acquisition unit 43e acquires versions that correspond to the moved V-Node, which is stored in the routing table 50, from each VM 31 and the server device 21 in Step S17. The comparison unit 43f compares the acquired versions of the routing tables 50 of each VM 31 and the server device 21 and determines whether or not there is a routing table 50 of an old version in Step S18. When there is a routing table 50 of the old version (Yes in Step S18), the update unit 43g updates the routing table 50 of the old version in Step S19. On the other hand, when there is no routing table 50 of the old version (No in step S18), the process proceeds to Step S20 to be described later. The stop unit 43d transmits data by transmitting a data transmission restarting request to the transmission source in Step S20 and ends the process.

As above, the management server 40 stores the predetermined period for each V-Node that is acquired by dividing a plurality of queries 33 into a plurality of groups. In addition, the management server 40 stops the transmission of data when a predetermined period corresponding to the V-Node has elapsed after the movement of the V-Node. Then, the management server 40 acquires the versions of the routing tables 50 relating to the moved V-Node from each VM 31 and the server device 21. The management server 40 compares the acquired versions with one other and acquires the consistency of the routing tables 50 by updating the routing table 50 of an old version. Thus, according to the management server 40, the data order of requested accuracy can be assured. In addition, according to the management server 40, the transmission of data does not need to be stopped every time the query 33 is moved, whereby the overhead can be suppressed.

Furthermore, according to the management server 40, the transmission of data is stopped when a predetermined period elapses after the movement of the V-Node and the versions are checked. Therefore, according to the management server 40, the data order of requested accuracy can be efficiently assured.

In addition, according to the management server 40, when the predetermined period corresponding to the moved V-Node is shorter than the maximum period, the consistency of the routing tables 50 is checked, and, when the predetermined period is the maximum period or more, the consistency is not checked, whereby the processing load can be reduced.

[c] Third Embodiment

The third embodiment will now be described. Since the configuration of a CEP system according to the third embodiment is almost the same as that according to the second embodiment described above, different parts will be described. In this embodiment, similarly to the first embodiment described above, a management server 40 acquires and compares the versions of routing tables 50 from VMs 31 for every predetermined period for which the data order of requested accuracy is assured and updates a routing table 50 of an old version. FIG. 11 is a diagram that schematically illustrates the configuration of the CEP system according to the third embodiment. In addition, the same reference numeral is assigned to the same part as that of the second embodiment described above, and the description thereof will not be presented here.

Figures 12, 13:
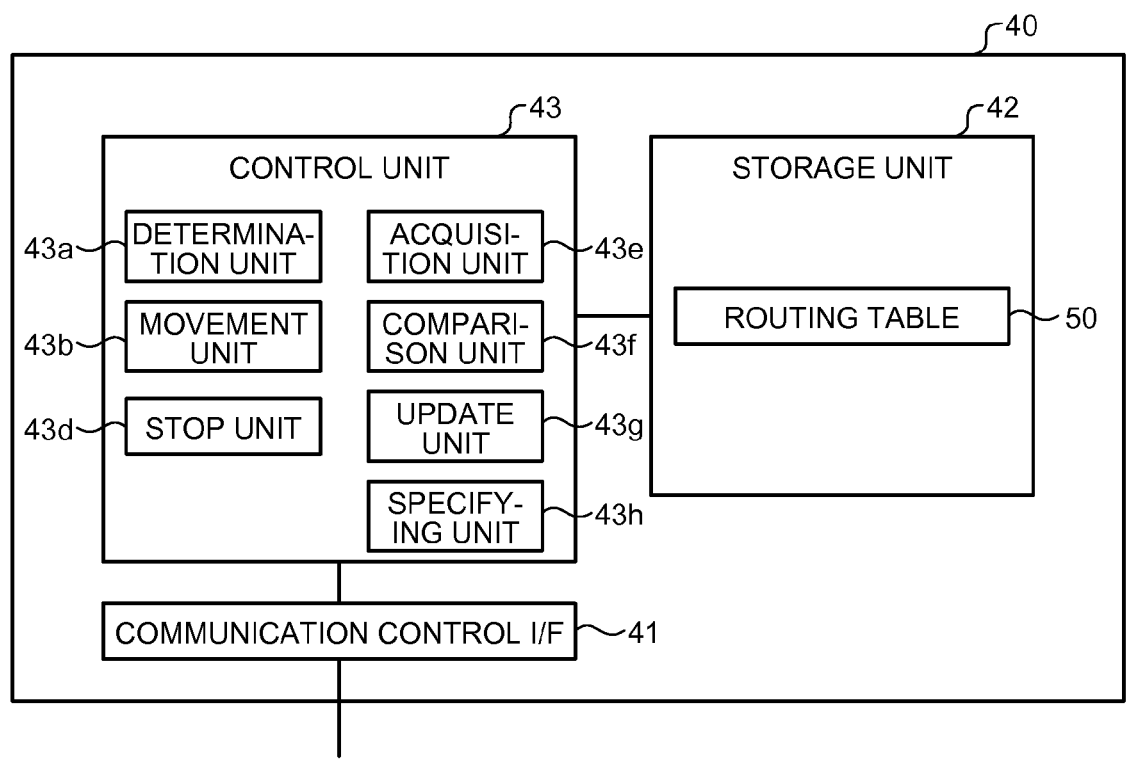
FIG. 12 is a diagram that illustrates an example of the data configuration of a routing table.
FIG. 13 is a diagram that illustrates an example of the configuration of a management server.

When routing tables 50 are updated, VMs 31, the server device 21, and the management server 40 store update time and date as a version. When queries 33 of a V-Node are moved, a data stream processing engine 32 of the VM 31 that is a movement destination updates the storage destination of the queries 33 of the moved V-Node in the routing tables 50 and stores update date and time that is updated as a version. Then, the data stream processing engine 32 notifies the VMs 31, the server device 21, and, the management server 40 of the ID of the moved V-Node, the ID of the VM 31 as the movement destination, and the update date and time. When the movement is notified, the VMs 31, the server device 21, and the management server 40 update the storage destination of the queries 33 of the moved V-Node in the routing tables 50, which has been notified, and updates the version with the notified update date and time. FIG. 12 is a diagram that illustrates an example of the data configuration of the routing table. Here, the same reference numeral is assigned to the same part as that of the second embodiment described above, and the description thereof will not be presented. As illustrated in FIG. 12, in the routing table 50, the update date and time is stored in the item of the version number. The example illustrated in FIG. 12 represents that, in the V-Node having an ID of "12", the ID of the VM 31 as the storage destination is "1", and the update date and time is "10:01:20.12 on Nov. 1, 2011".

In addition, the data stream processing engine 32 of each VM 31 stores date and time information 53 relating to the date and time at which data is transmitted first during a predetermined period for every predetermined period. For example, when date and time is included in the data by adding the reception date and time to data received by the server device 21 or the like, the date and time information 53 may be date and time information that represents the date and time included in the data. In addition, the date and time information 53 may be date and time information that represents date and time at which data is transmitted by the data stream processing engine 32. The data stream processing engine 32 transmits the stored date and time information 53 to the management server 40 for every predetermined period. In addition, when transmission of date is not performed during a predetermined period, the data stream processing engine 32 transmits the current time as the date and time information to the management server 40 for every predetermined period. The predetermined period may be a predetermined period, in which the management server 40 acquires the versions of the routing tables 50 from the VMs 31 and compares the versions, or less. Accordingly, the management server 40 is notified of the data transmission date and time or the current date and time from the VMs 31 for every predetermined period.

FIG. 13 is a diagram that illustrates an example of the configuration of the management server. Here, the same reference numeral is assigned to the same part as that of the second embodiment described above, and the description thereof will not be presented.

The control unit 43 further includes a specifying unit 43*h*. The specifying unit 43*h* performs various specifying operations. For example, the specifying unit 43*h* specifies transmission date and time at which data was transmitted first to the other VM 31 during a previous predetermined period based on the date and time information notified from each VM 31. The specifying unit 43*h*, for example, specifies date and time of the date and time information of which the date and time is the oldest among the date and time information notified from each VM 31 and the transmission date and time at which data was transmitted first to the other VM 31 during a previous predetermined period.

The stop unit 43*d* compares the transmission date and time that is the oldest in the previous predetermined period specified by the specifying unit 43*h* and the update date and time that is stored in the routing table 50 as a version with each other for every predetermined period for which the data order of requested accuracy is assured. Then, the stop unit 43*d* stops transmitting the data by transmitting transmission stop requests to the transmission source of the data and the VMs 31 when the transmission date and time is the update date and time or later. On the other hand, when the transmission date and time is before the update date and time, the stop unit 43*d* does not transmit transmission stop requests.

When the stop unit 43*d* transmits the transmission stop requests, when the reception of control packets from all the VMs 31 is notified, the acquisition unit 43*e* acquires the versions of the routing tables 50 from the VMs 31 and the server device 21. In other words, when the oldest transmission date and time during the previous predetermined period is the update date and time of the routing tables 50 or later, the management server 40 stops the transmission of data from the transmission source of the data and the VMs 31 and acquires the versions of the routing tables 50. On the other hand, when the stop unit 43*d* does not transmit transmission stop requests, the acquisition unit 43*e* acquires the versions of the routing tables 50 from the VMs 31 and the server device 21 for every predetermined period. In other words, when the oldest transmission date and time during the previous predetermined period is before the update date and time of the routing tables 50, the management server 40 does not stop the transmission of data from the transmission source of the data and the VMs 31 but acquires the versions of the routing tables 50.

The comparison unit 43*f* compares the acquired versions of the routing tables 50 of the VMs 31 and the server device 21. When a routing table 50 of an old version is stored in any one of the VMs 31 and the server device 21 as a result of the comparison, The update unit 43*g* updates the routing table 50.

Figure 14:
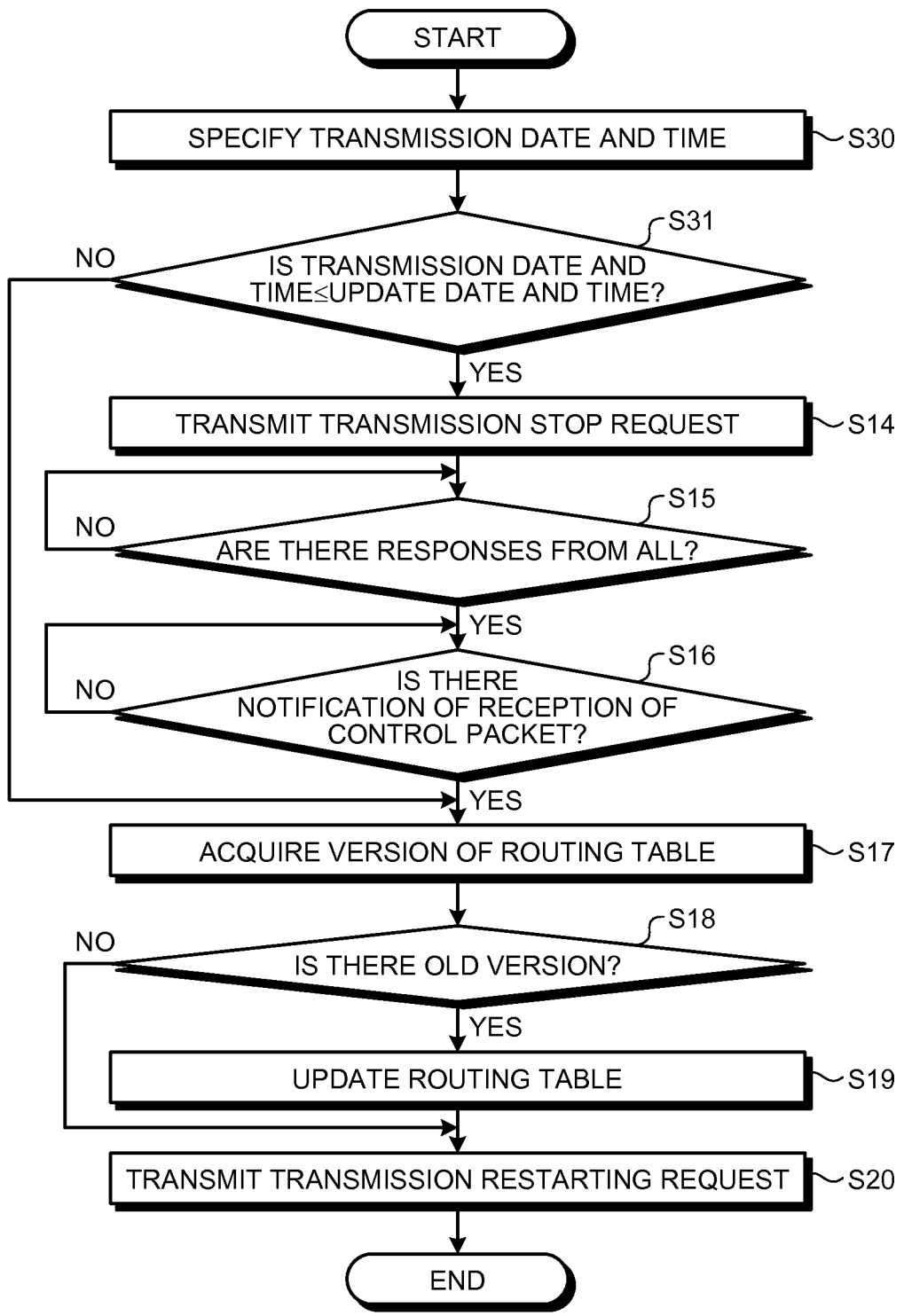
FIG. 14 is a flowchart that illustrates the sequence of a data order assuring process.

FIG. 14 is a flowchart that illustrates the sequence of a data order assuring process. Here, the same reference numeral is assigned to the same part as that of the second embodiment described above, and the description thereof will not be presented. This data order assuring process, for example, is performed for every predetermined period for which the data order of requested accuracy is assured.

The specifying unit 43*h* specifies the transmission date and time that is the oldest during the previous predetermined period based on the date and time information notified from each VM 31 in Step S30. The stop unit 43*d* determines whether or not the oldest transmission date and time during the previous predetermined period is the update date and time of the routing tables 50 or later in Step S31. When the transmission date and time is after the update date and time (Yes in Step S31), the process proceeds to Step S14, and the transmission of data is stopped by transmitting transmission stop requests. On the other hand, when the transmission date and time is newer than the update date and time (No in Step S31), the process proceeds to Step S17, and the versions of the routing tables 50 are acquired from the VMs 31 and the server device 21.

As above, when the oldest transmission date and time during the previous predetermined period is the update date and time of the routing tables 50 or later, the management server 40 stops the transmission of data from the transmission source of the data and the VMs 31 and acquires the versions of the routing tables 50. In this way, according to the management server 40, when the transmission date and time is the update date and time or later, there is a possibility that the date order may change, and accordingly, by stopping the transmission of data, the date order before or after the stop of the transmission of data can be assured.

In addition, when the oldest transmission date and time during the previous predetermined period is newer than the update date and time of the routing tables 50, the management server 40 does not stop the transmission of data from the transmission source of data and the VMs 31 and acquires the versions of the routing tables 50. In this way, according to the management server 40, when the transmission date and time is before the update date and time, the date order is maintained, and accordingly, by not stopping the transmission of data and acquiring the versions of the routing tables 50, a delay due to the stop of data transmission can be suppressed.

[d] Fourth Embodiment

Until now, although the embodiments relating to the disclosed devices have been described, the disclosed technique may be performed in various forms other than the above-described embodiments. Thus, hereinafter, other embodiments that are included in the present invention will be described.

For example, in the first embodiment described above, although a case has been described in which the transmission of data to a plurality of nodes 11 are stopped for every predetermined period, the disclosed device is not limited thereto. For example, when a query 33 is moved between a plurality of nodes 11, the transmission of data may be stopped when a predetermined period elapses after the movement of the query 33. In such a case, the data order of requested accuracy can be assured.

In addition, in the second embodiment described above, although a case has been described in which the transmission of data is stopped when a predetermined period elapses after the movement of the V-Node, the disclosed device is not limited thereto. For example, it may be configured such that one predetermined period is set, and the transmission is stopped when the predetermined period elapses after the movement of the V-Node.

Furthermore, in the second embodiment described above, although a case has been described in which the transmission of data is stopped once when a predetermined period elapses after the movement of the V-Node, the disclosed device is not limited thereto. For example, the transmission may be stopped a plurality of times every predetermined period. In other words, the transmission may be stopped at least once for every predetermined period.

In addition, in the second embodiment described above, although a case has been described in which a predetermined period is stored in the stop period table 52 for each V-Node that is acquired by dividing a plurality of queries 33 into a plurality of groups, the disclosed device is not limited thereto. For example, it may be configured such that a field in which a predetermined period is stored is arranged in the routing table 50, and the predetermined period is stored in the routing table 50.

In addition, in the second embodiment described above, although a case has been described in which the transmission of data is stopped once when a predetermined period elapses after the movement of the V-Node, the disclosed device is not limited thereto. For example, similarly to the third embodiment, the update date and time is stored in the routing table 50 as a version. In addition, the data stream processing engine 32 of each VM 31 transmits date and time information relating to the date and time at which data has been transmitted first during the predetermined period to the management server 40 for every predetermined period. When a predetermined period elapses after the movement of the V-Node, the management server 40 compares the oldest transmission date and time during the previous predetermined period and the update date and time that is stored in the routing table 50 as a version. When the transmission date and time is the update date and time or later, the management server 40 stops the transmission of data from the transmission source of the data and the VMs 31 and acquires the versions of the routing tables 50. On the other hand, when the transmission date and time is before the update date and time, it is preferable that the management server 40 does not stop the transmission of data from the transmission source of the data and the VMs 31 but acquires the versions of the routing tables 50.

In addition, in the second and third embodiments described above, although a case has been described in which queries 33 are moved in units of V-Nodes that are acquired by dividing a plurality of queries 33 into a plurality groups, the disclosed device is not limited thereto. For example, the queries 33 may be moved in units of queries 33. In such a case, the routing table 50 may be configured such that the storage destination can be stored therein in units of queries 33. In addition, in such a case, for example, it may be configured such that a predetermined period is stored in the stop period table 52 in units of queries 33, and the transmission of data is stopped when a predetermined period corresponding to a query 33 elapses after the movement of the query 33.

Furthermore, each constituent element of each device illustrated in the diagrams is in a functional and conceptual sense, and it is unnecessary to physically configure the constituent element as illustrated in the diagrams. In other words, a specific form of division or integration of the devices is not limited to that illustrated in the diagrams, and the whole or a part thereof may be configured to be functionally or physically divided or integrated in an arbitrary unit in accordance with various loads, the usage circumstances, or the like. For example, the processing units of the stop unit 14, the acquisition unit 15, the comparison unit 16, and the update unit 17 illustrated in FIG. 1 may be appropriately integrated. In addition, for example, the processing units of the determination unit 43a, the movement unit 43b, the execution unit 43c, the stop unit 43d, the acquisition unit 43e, the comparison unit 43f, the update unit 43g, and the specifying unit 43h illustrated in FIGS. 8 and 13 may be appropriately integrated. Furthermore, the whole or a part of each processing function that is performed in each processing unit may be realized by a CPU and a program that is interpreted and executed by the CPU or may be realized by hardware using wired logics.

Data Order Assuring Program

Figure 15:
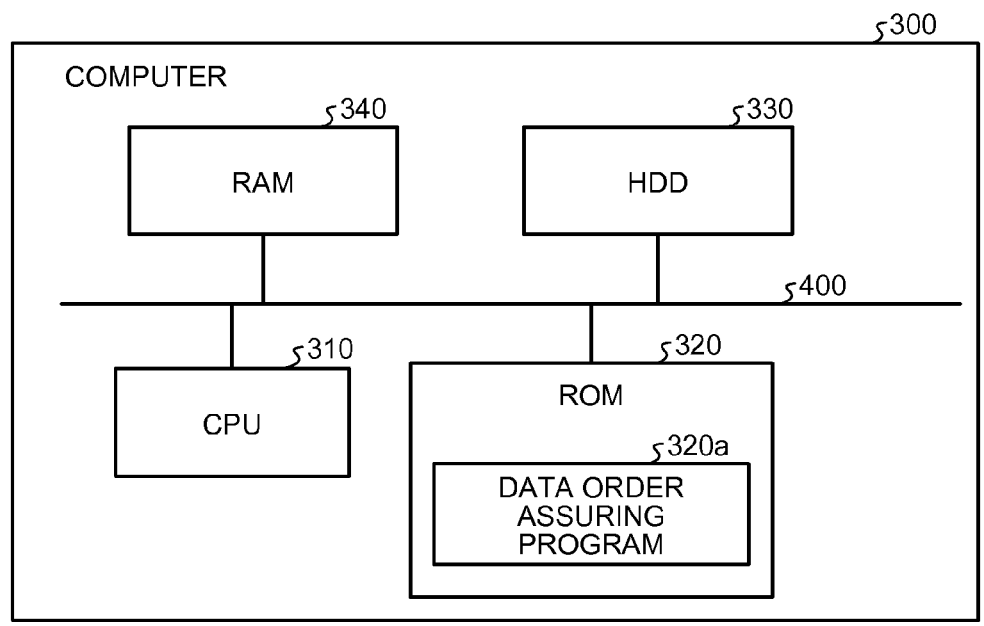
FIG. 15 is a diagram that illustrates a computer that executes a data order assuring program.

In addition, various processes described in the above-described embodiments may be realized by executing a program prepared in advance by using a computer system such as a personal computer or a workstation. Thus, hereinafter, an example of the computer system that executes a program having the same functions as those of the above-described embodiment will be described. FIG. 15 is a diagram that illustrates a computer that executes a data order assuring program.

As illustrated in FIG. 15, a computer 300 includes a central processing unit (CPU) 310, a read only memory (ROM) 320, a hard disk drive (HDD) 330, and a random access memory (RAM) 340. The units 310 to 340 are interconnected through a bus 400.

In the ROM 320, a data order assuring program 320a that exhibits the same functions as those of the stop unit 14, the acquisition unit 15, the comparison unit 16, and the update unit 17 of the first embodiment described above is stored in advance. Alternatively, in the ROM 320, the data order assuring program 320a that exhibits the same functions as those of the execution unit 43c, the stop unit 43d, the acquisition unit 43e, the comparison unit 43f, the update unit 43g, and the specifying unit 43h of the second or third embodiment described above is stored in advance. In addition, the data order assuring program 320a may be appropriately divided.

By the CPU 310 reading the data order assuring program 320a from the ROM 320 and executing the data order assuring program 320a, the operations that are the same as those of the control unit of each one of the first and third embodiments are performed. In other words, the data order assuring program 320a performs the same operations as those of the stop unit 14, the acquisition unit 15, the comparison unit 16, and the update unit 17 of the first embodiment described above or those of the execution unit 43c, the stop unit 43d, the acquisition unit 43e, the comparison unit 43f, the update unit 43g, and the specifying unit 43h of the second or third embodiment described above.

In addition, it is unnecessary to initially store the above-described data order assuring program 320a in the ROM 320. The data order assuring program 320a may be stored in the HDD 330.

For example, the program may be stored in a "portable physical medium" such as a flexible disk (FD), a CD-ROM, a DVD disc, a magneto-optical disk, or an IC card that is inserted into the computer 300. In such a case, the computer 300 may read the program from any of them and execute the program.

In addition, the program may be stored in "another computer" that is connected to the computer 300 through a public line, the Internet, a LAN, a WAN, or the like. In such a case, the computer 300 may be configured to read the program from any one of them and execute the program.

Overhead that is accompanied with the movement of a query can be suppressed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A server device connected to a plurality of data processing nodes via a network, the server device comprising:
   a memory; and
   a processor coupled to the memory, wherein the processor executes a process comprising:

selecting a first data processing node from the plurality of data processing nodes, based on query information stored in a routing table and a key information included in a received data, the routing table including the query information and a corresponding data processing node;

transmitting the received data to the first data processing node at timings other than within a reserving period;

acquiring version information of a plurality of routing tables stored in the each of the plurality of data processing nodes respectively, when the server device is operating in the reserving period; and updating the routing table of the server device based on the version information;

wherein when a query that is processed in a data processing node among the plurality of data processing nodes is moved from the data processing node to another data processing node, query information, corresponding data processing node and version information included in the routing table are updated.

2. The server device according to claim 1, wherein the reserving period starts at a time when a predetermined period elapses after the query is moved, in a case where the query is moved between the plurality of data processing nodes.

3. The server device according to claim 2, wherein the memory stores the predetermined period for each query, the reserving period starts at a time when the predetermined period corresponding to a query elapses after the query is moved, and the acquiring includes acquiring the version information included in a routing table relating to the moved query.

4. The server device according to claim 2, wherein the memory stores the predetermined period for each group that is acquired by dividing a plurality of queries into a plurality of groups, the reserving period time starts at a time when the predetermined period corresponding to a group to which a query belongs elapses after the query is moved, and the acquiring includes acquiring the version information included in a routing table relating to each query of the group to which the moved query belongs.

5. The server device according to claim 1, wherein the processor executes the process when the predetermined period is shorter than a maximum period in which data is transmitted between the plurality of data processing nodes.

6. The server device according to claim 1, wherein the process further comprises:

specifying a piece of information representing date and time at which data is transmitted to another data processing node first during a period from a plurality of pieces of the information that are received from the plurality of data processing nodes for every period, and wherein the routing table stores update date and time as the version information, and the reserving period is provided every predetermined period when the date and time represented by the specified piece of information is the stored update date and time or later.

7. A non-transitory computer-readable storage medium storing therein a data processing node control program that causes a computer to execute a process, comprising:

selecting a first data processing node from a plurality of data processing nodes that the computer is connected, based on query information stored in a routing table and a key information included in a received data, the routing table including the query information and a corresponding data processing node;

transmitting the received data to the first data processing node at timings other than within a reserving period;

acquiring version information of a plurality of routing tables stored in the each of the plurality of data processing nodes respectively, when the computer is operating in the reserving period; and updating the routing table of the computer based on the version information; wherein when a query that is processed in a data processing node among the plurality of data processing nodes is moved from the data processing node to another data processing node, query information, corresponding data processing node and version information included in the routing table are updated.

8. A method of controlling a data processing node using a computer connected to a plurality of data processing nodes via a network, the method comprising:

selecting, using a processor, a first data processing node from the plurality of data processing nodes, based on query information stored in a routing table and a key information included in a received data, the routing table including the query information and a corresponding data processing node;

transmitting, using the processor, the received data to the first data processing node at timings other than within a reserving period;

acquiring, using the processor, version information of a plurality of routing tables stored in the each of the plurality of data processing nodes respectively, when the computer is operating in the reserving period; and updating, using the processor, the routing table of the computer based on the version information;

wherein when a query that is processed in a data processing node among the plurality of data processing nodes is moved from the data processing node to another data processing node, query information, corresponding data processing node and version information included in the routing table are updated.

9. A server device connected to a plurality of data processing nodes via a network, the server device comprising:

a memory; and a processor coupled to the memory, wherein the processor executes a process comprising:

selecting a first data processing node from the plurality of data processing nodes, based on transaction requesting sentence information stored in a routing table and a key information included in a received data, the routing table including the transaction requesting sentence information and a corresponding data processing node;

transmitting the received data to the first data processing node at timings other than within a reserving period;

acquiring version information of a plurality of routing tables stored in the each of the plurality of data processing nodes respectively when the server device is operating in the reserving period;

updating the routing table of the server device based on the version information; wherein when a transaction requesting sentence that is processed in a data processing node among the plurality of data processing nodes is moved from the data processing node to another data processing node, transaction requesting sentence information, corresponding data processing node and version information included in the routing table are updated.

* * * * *